(12) United States Patent
Imafuku et al.

(10) Patent No.: US 7,589,904 B2
(45) Date of Patent: Sep. 15, 2009

(54) PROJECTION TYPE IMAGE DISPLAY DEVICE

(75) Inventors: Daisuke Imafuku, Fujisawa (JP); Takanori Hisada, Yokohama (JP); Hiroki Yoshikawa, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 33 days.

(21) Appl. No.: 11/740,319

(22) Filed: Apr. 26, 2007

(65) Prior Publication Data

US 2007/0285780 A1    Dec. 13, 2007

(30) Foreign Application Priority Data

Jun. 8, 2006    (JP)    ................ 2006-159233

(51) Int. Cl.
*G02B 3/00*    (2006.01)
*G02B 9/00*    (2006.01)
*G02B 5/124*    (2006.01)
*G03B 21/22*    (2006.01)

(52) U.S. Cl. .................. 359/649; 359/514; 353/119

(58) Field of Classification Search .......... 359/649–651, 359/708, 720, 511, 513, 514; 353/74, 119, 353/122
See application file for complete search history.

(56) References Cited

U.S. PATENT DOCUMENTS

| 3,650,614 A | 3/1972 | Shimoda |
| 2006/0221312 A1 | 10/2006 | Matsuura |

FOREIGN PATENT DOCUMENTS

| EP | 1 462 852 | 9/2004 |
| FR | 2 272 412 | 12/1975 |
| FR | 2 868 552 | 10/2005 |
| JP | 2002-082387 | 3/2002 |
| WO | WO94/08264 | 4/1994 |

*Primary Examiner*—Alicia M Harrington
(74) *Attorney, Agent, or Firm*—Antonelli, Terry, Stout & Kraus, LLP.

(57) ABSTRACT

Both ends of a transparent cover which is formed of a curved member are fitted to a lens guard and a mirror guard, and a free-shaped surface mirror and a free-shaped surface lens are housed in a sealed space defined within a projection type image display device.

15 Claims, 9 Drawing Sheets

F I G . 9
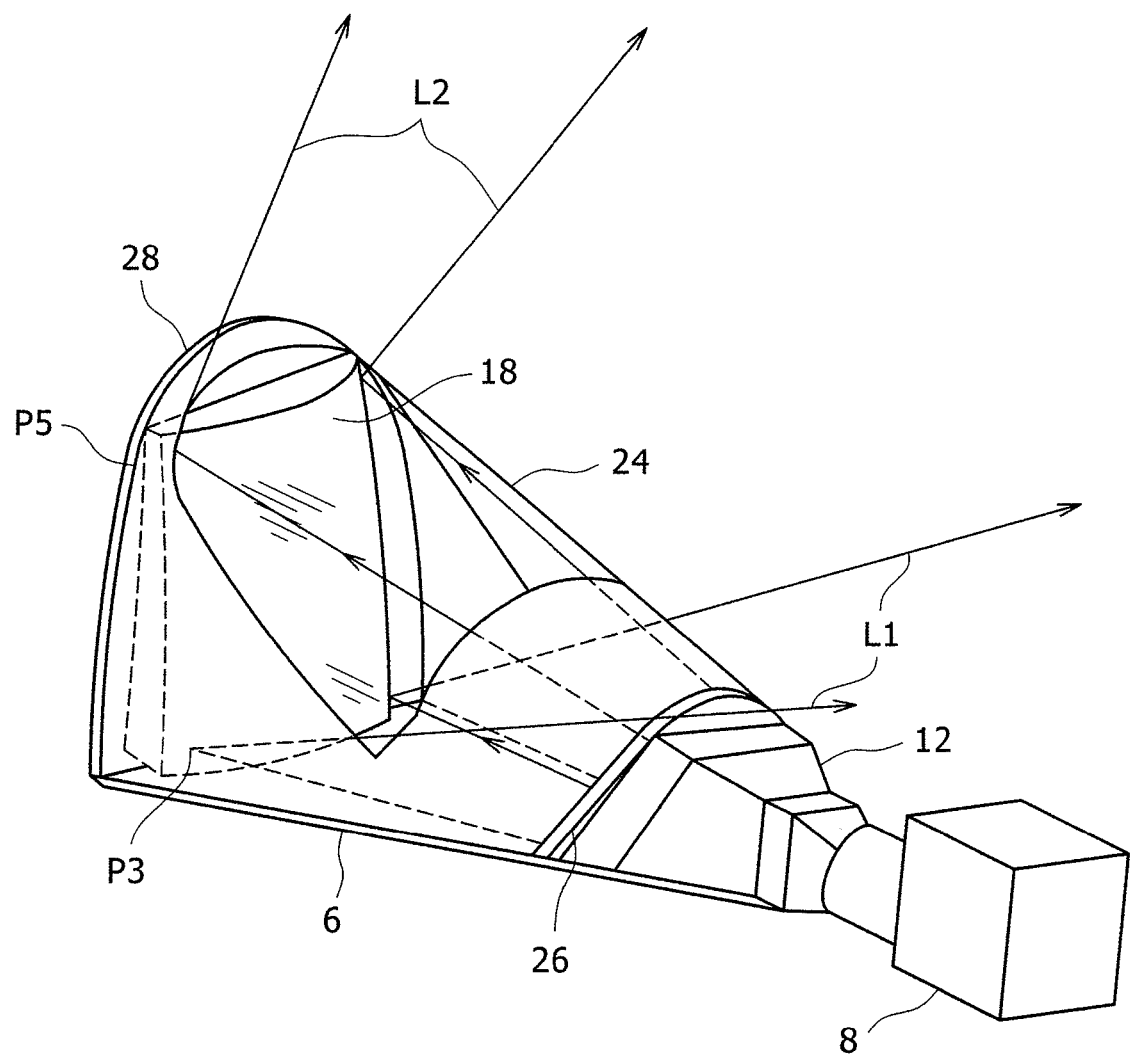

PROJECTION TYPE IMAGE DISPLAY DEVICE

CLAIM OF PRIORITY

The present application claims priority from Japanese application serial no. JP 2006-159233, filed on Jun. 8, 2006, the content of which is hereby incorporated by reference into this application.

BACKGROUND OF THE INVENTION (1) Field of the Invention

The present invention relates to a projection type image display device.

(2) Description of the Related Art

In a projection type image display device that projects an image at a given angle (for example, from a lower side of a screen) with respect to an oblique projection, that is, a normal to a screen principal plane, an aspherical mirror or a free-shaped surface mirror is employed in an outgoing optical part of a projection optical system. In general, those mirrors are manufactured by molding with a resin and depositing aluminum or silver, taking mass productivity into consideration. However, the lenses are liable to be charged, and therefore liable to be contaminated with the dust or dirt in air. When the dust or dirt that is attached to the mirror surface is wiped off, hair line shaped scratches are produced on the mirror surface due to components contained in the dust or dirt which are harder than a coating material of the mirror surface. There arise such disadvantages that not only those scratches induce a deterioration of the image contrast, but also moisture enters the mirror from the scratches to rust the deposited film of the mirror.

In order to cope with the above problems, Japanese Patent Application Laid-Open Publication No. 2002-082387 discloses a technique in which a projection optical system is housed in a casing with a window, and a transparent plane plate that is formed of a glass plate is disposed between the projection optical system and the screen to prevent the mirror surface from being contaminated by the dust or dirt.

SUMMARY OF THE INVENTION

However, in the above projection optical system, the compact property is emphasized, and the aspherical mirror or the free-shaped surface mirror is employed in the outgoing optical part to remarkably reduce the projection distance. For that reason, since the angle of view is extremely large, the above technique has suffered from such a problem that an angle at which the image lights at both ends of the screen input the transparent plate becomes large, and both of the ends of the screen are darkened due to the reflection loss at the transparent plate.

The present invention has been made to address the above problems with the related art, and therefore an object of the present invention is to provide a technique in which an optical part can be protected from dust or dirt in air while suppressing the deterioration of the image quality.

In order to achieve the above object, the present invention provides a transparent member that covers an outgoing optical part.

BRIEF DESCRIPTION OF THE DRAWINGS

These and other features, objects and advantages of the present invention will become more apparent from the following description when taken in conjunction with the accompanying drawings wherein:

FIG. 9 is a perspective view showing the main portion of the projection type image display device according to the embodiment.

DETAILED DESCRIPTION OF THE PREFERRED EMBODIMENTS

Hereinafter, a description will be given of an embodiment of the present invention with reference to the accompanying drawings. The present invention is not limited to an example shown in the figure.

Figure 1:
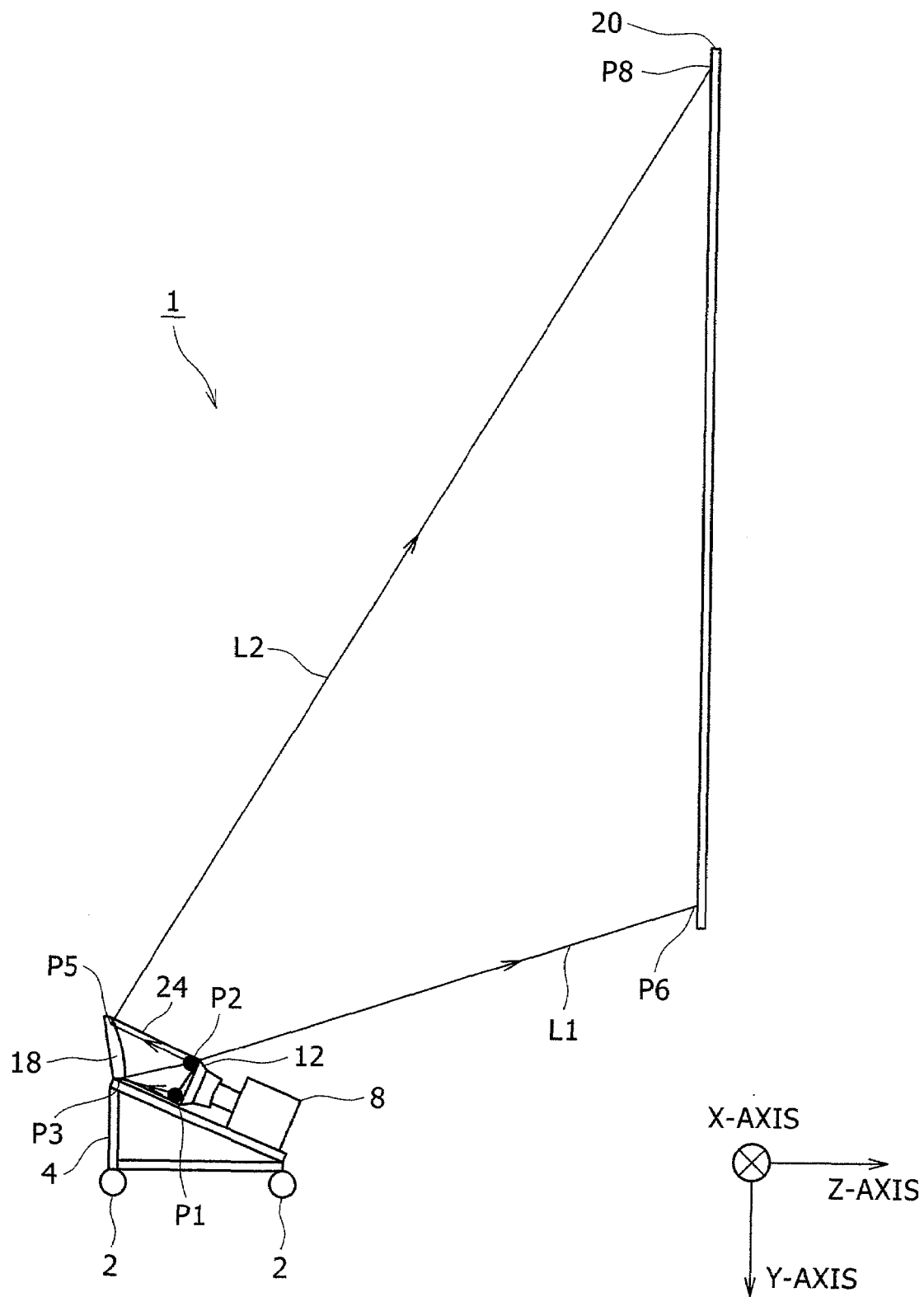
FIG. 1 is a cross-sectional view showing the outline of a projection type image display device according to an embodiment of the present invention.
Figure 2:
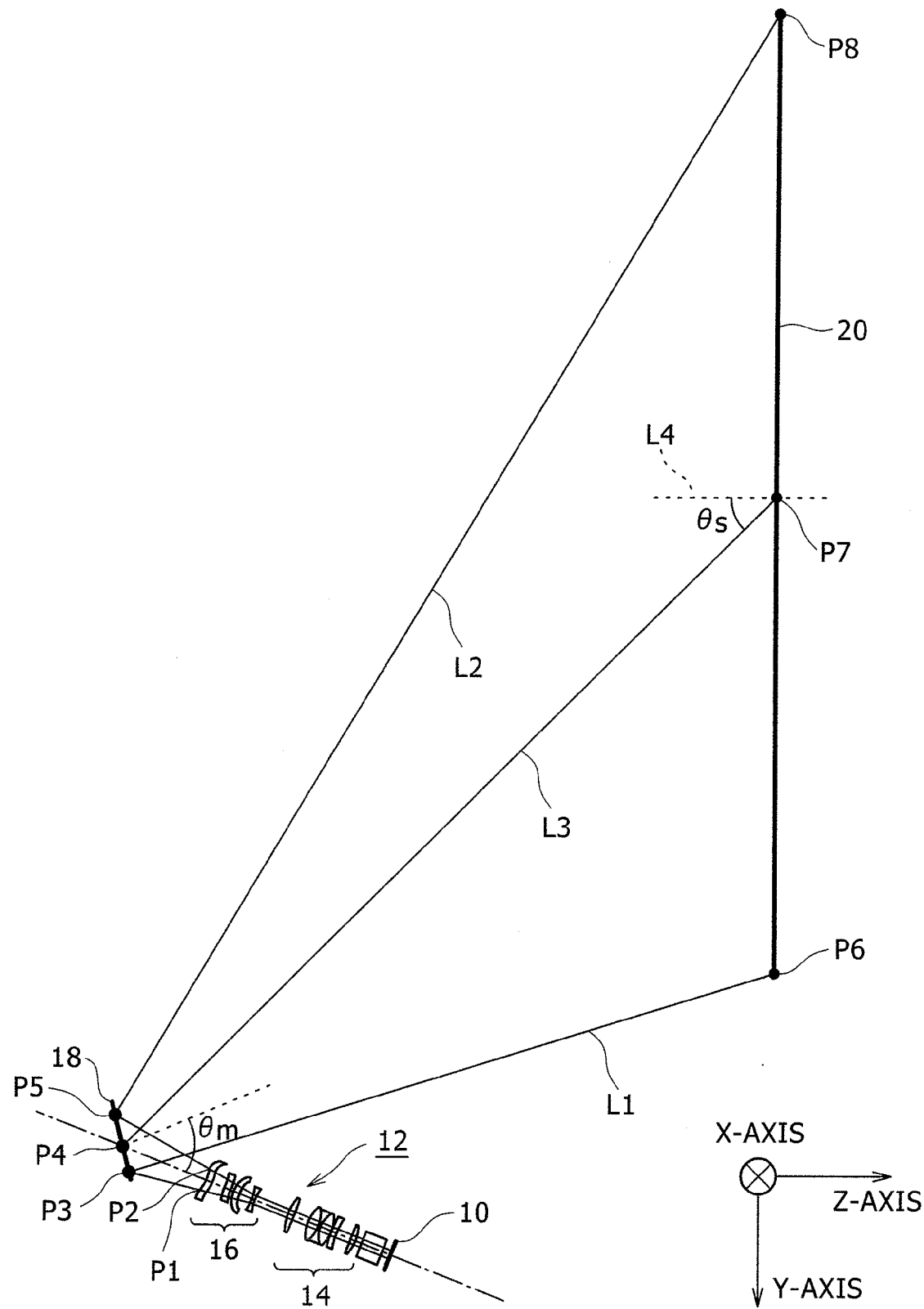
FIG. 2 is a side view showing the main portion of an optical system in the projection type image display device according to the embodiment.

FIG. 1 is a cross-sectional view showing the outline of a projection type image display device 1 according to an embodiment of the present invention. FIG. 2 is a side view showing the main portion of an optical system in the projection type image display device.

FIGS. 1 and 2 show the main portion of the optical system with a Y-Z cross section in the X, Y, and Z orthogonal coordinate system. In this example, it is assumed that an origin of the X, Y, and Z orthogonal coordinate system is in the center of the display screen of an image display element 10 that forms an image generation source 8 that will be described later, and a Z-axis is in parallel to a normal to a screen 20 that will be described later. It is assumed that a Y-axis is in parallel with a direction along short sides of the screen 20, that is, a vertical direction of the screen 20, and an X-direction is in parallel to the horizontal direction of the screen 20.

As shown in FIG. 1, in the projection type image display device 1, the image generation source 8 for displaying an image is disposed on a bottom plate 6 that is fixed to a stand 4 having casters 2. The image generation source 8 includes a light modulation device such as a reflective or transmissive liquid crystal panel or the image display element 10 having plural minute mirrors, and a lamp for irradiating the light modulation device. Also, the image display element 10 can be of a system in which plural images are synthesized together such as a so-called three-plate type, and in this case, there is provided a synthetic optical system such as a synthetic prism. Alternatively, the system can include a projection CRT.

A projection lens 12 that forms a first optical system is disposed in the light outgoing direction of the image display element 10. The projection lens 12 is made up of a front group 14 with plural refractive lenses each having a surface configuration that is rotationally symmetrical, and a rear group 16 with plural lenses that includes a lens (hereinafter referred to as "free-shaped surface lens") having at least one surface which has a rotationally asymmetrical free-shaped surface configuration. The front group 14 is disposed at a travel direction side of a light that is output from the image display element 10, and the back group 16 is disposed at a travel direction side of a light that is output from the front group 14.

At least one reflective mirror (hereinafter referred to as "free-shaped surface mirror") having a reflective surface of a rotationally asymmetric free-shaped surface configuration which forms a second optical system is disposed at a travel direction side of a light that is output from the rear group 16. The screen 20 is disposed in a travel direction of a light that is reflected from a free-shaped surface mirror 18. In this embodiment, an asymmetrical mirror can be used as the second optical system.

Figure 3:
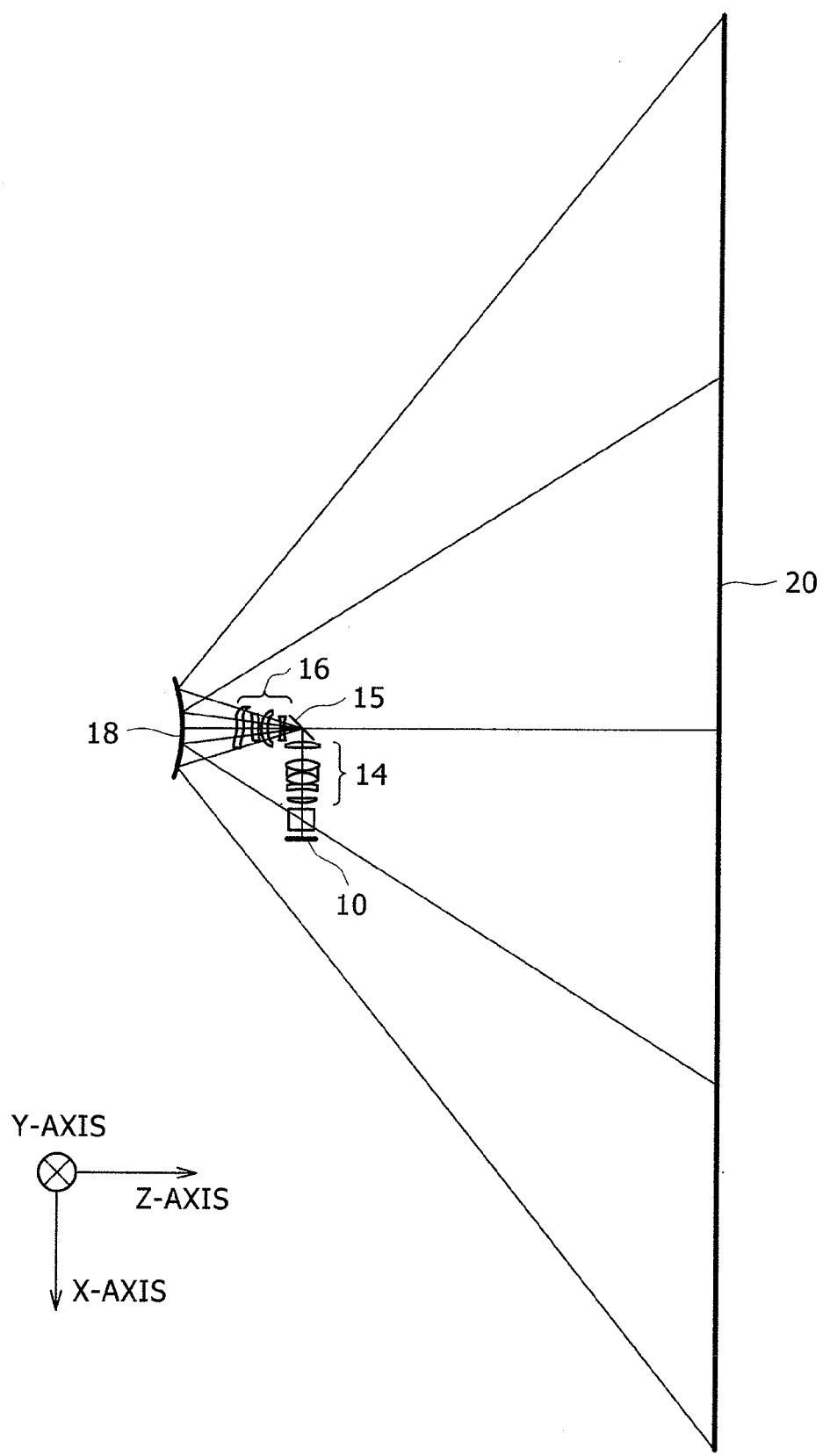
FIG. 3 is a cross-sectional view showing the arrangement of an optical system and an optical path in the projection type image display device taken along a line X-Z according to the embodiment.

Also, in this embodiment, lenses that form the projection lens 12 are linearly disposed. However, as shown in FIG. 3, a reflection mirror 15 can be disposed between the free-shaped surface mirror 18 and the rear group 16 of the projection lens 12 in such a manner that the optical axis of the projection lens 12 is bent toward the X axial direction. With the above configuration, it is possible to prevent the overall length of the projection type image display device from being lengthened. Also, in order to prevent the overall length of the projection type image display device from being lengthened, the reflection mirror 15 can be disposed between the front group 14 and the rear group 16 of the projection lens 12, or at the middle of the front group 14.

In this embodiment, as shown in FIG. 2, a light beam L1 that is output from a lower end P1 of the projection lens 12 is reflected by a lower end P3 of the free-shaped surface mirror 18 and guided to a lower end P6 of the screen 20. Also, a light beam L2 that is output from an upper end P2 of the projection lens 12 is reflected by an upper end P5 of the free-shaped surface mirror 18 and guided to an upper end P8 of the screen 20.

As shown in FIG. 2, the image display element 10 is disposed in such a manner that the image display element 10 is positioned on the optical axis of the projection lens 12. Accordingly, a light beam L3 (hereinafter referred to as "screen center light beam") that penetrates through the center of the display screen of the image display element 10, passes through the center of an entrance pupil of the projection lens 12, and goes toward the screen center on the screen 20 travels substantially along the optical axis of the projection lens. The screen center optical beam L3 is reflected at a point P4 on the reflective surface of the free-shaped surface mirror 18, and input to a point P7 of the screen center on the screen 20 at a given angle (that is, obliquely) with respect to a normal L4 to the screen (an angle (hereinafter referred to as "oblique input angle") formed between the screen center light beam L3 and the normal L4 is θs).

As described above, when the light beam that has been output from the projection lens 12 is input obliquely with respect to the screen 20, there occurs diverse aberrations that are rotationally asymmetrical with respect to the optical axis, in addition to a so-called trapezoidal distortion in which the projected rectangular configuration becomes trapezoidal. In this embodiment, those aberrations are corrected by the rear group 16 of the projection lens 12 and the reflective surface of the second optical system (free-shaped surface mirror 18).

As shown in FIG. 2, an optical path length of the light beam L2 that extends from the point P5 to the point P8 is longer than the optical path length of the light beam L1 that extends from the point P3 to the point P6. This means that an image point P8 on the screen is farther than an image point P6, viewed from the projection lens 12.

Under the circumstances, an object point (a point on the display screen) corresponding to the image point P8 on the screen is positioned at a point closer to the projection lens 12, and an object point corresponding to the image point P6 is positioned at a point farther from the projection lens 12, to thereby correct the slope of the image screen. More specifically, a normal vector in the center of the display screen of the image display element 1 is inclined in a direction of positioning the free-shaped surface mirror 18 on the Y-Z plane.

A method of inclining the object plane in order to obtain the image surface that is inclined with respect to the optical axis has been well known. However, in the view angle having a practical size, the image surface is asymmetrically deformed with respect to the optical axis due to the inclination of the object plane, and it is difficult to correct the projection lens that is rotationally symmetrical.

In view of the above, in this embodiment, since a free-shaped surface lens 22 and the free-shaped surface mirror 18 which are rotationally asymmetrical are used, it is possible to cope with the asymmetric deformation of the image surface. For that reason, it is possible to largely reduce the distortion of the image surface of a low order by inclining the object plane, which is effective in assisting the aberration correction due to the free-shaped surface lens and the free-shaped surface mirror.

Hereinafter, the correction of the trapezoidal distortion or the aberration will be further described in more detail. The projection lens 12 that is the first optical system is a main lens for allowing the front group 14 to project the display screen of the image display element 10 to the screen 20, and corrects a basic aberration in the rotationally symmetrical optical system. The rear group 16 of the projection lens 12 includes the rotationally asymmetrical free-shaped surface lens 22. In this embodiment, the free-shaped surface lens 22 closest to the free-shaped surface mirror 18 is curved so that the recess is directed toward the light outgoing direction. Then, the second optical system has the free-shaped surface mirror 18 with a rotationally asymmetric free-shaped surface configuration.

The free-shaped surface mirror 18 is a rotationally asymmetric convex surface mirror which is curved in such a manner that the convex is partially directed toward the light reflecting direction. More specifically, the free-shaped surface mirror 18 is formed in such a manner that the curvature of a portion that reflects a light directed toward the lower portion of the screen 20 is larger than the curvature of a portion that reflects a light directed toward the upper portion of the screen 20. Also, it is possible that a portion of the free-shaped surface mirror 18 which reflects the light directed toward the lower portion of the screen 20 has a convex configuration in the light reflection direction, and a portion that reflects the light directed toward the upper portion of the screen 20 has a concave configuration in the light reflection direction.

The aberration produced by the oblique incidence is mainly corrected by the actions of the free-shaped surface lens of the first optical system and the free-shaped surface mirror 18 of the second optical system. In other words, in this embodiment, the second optical system mainly corrects the trapezoidal distortion, and the rear group 16 of the projection lens 12 which is the first optical system mainly corrects the asymmetrical aberration such as the distortion of the image surface.

Also, when the free-shaped surface lens 22 and the free-shaped surface mirror 18 are employed in the projection optical system as described above, it is possible to realize the correction of the trapezoidal adsorption produced by the oblique incidence in the projection lens 12 having the refractive surface without increasing the eccentricity of the lens or the lens diameter, and also without increasing the number of lenses.

As described above, in this embodiment, the first optical system includes at least one free-shaped surface lens that is rotationally asymmetrical, and the second optical system includes at least one free-shaped surface mirror that is rotationally asymmetrical, to thereby enable both of the trapezoidal distortion and the aberration which are produced by the oblique projection.

The above description is given on the basis of the embodiment shown in FIG. 2. However, the same concept as that of this embodiment can be applied to even a case in which the direction of bending the optical path due to the mirror exists on the plane including the long sides of the screen unlike FIG. 2.

Subsequently, the optical system according to this embodiment will be described with specific numeric values. One numeric value example of the present invention will be described with reference to FIGS. 3 to 6, and Tables 1 to 4.

Figure 4:
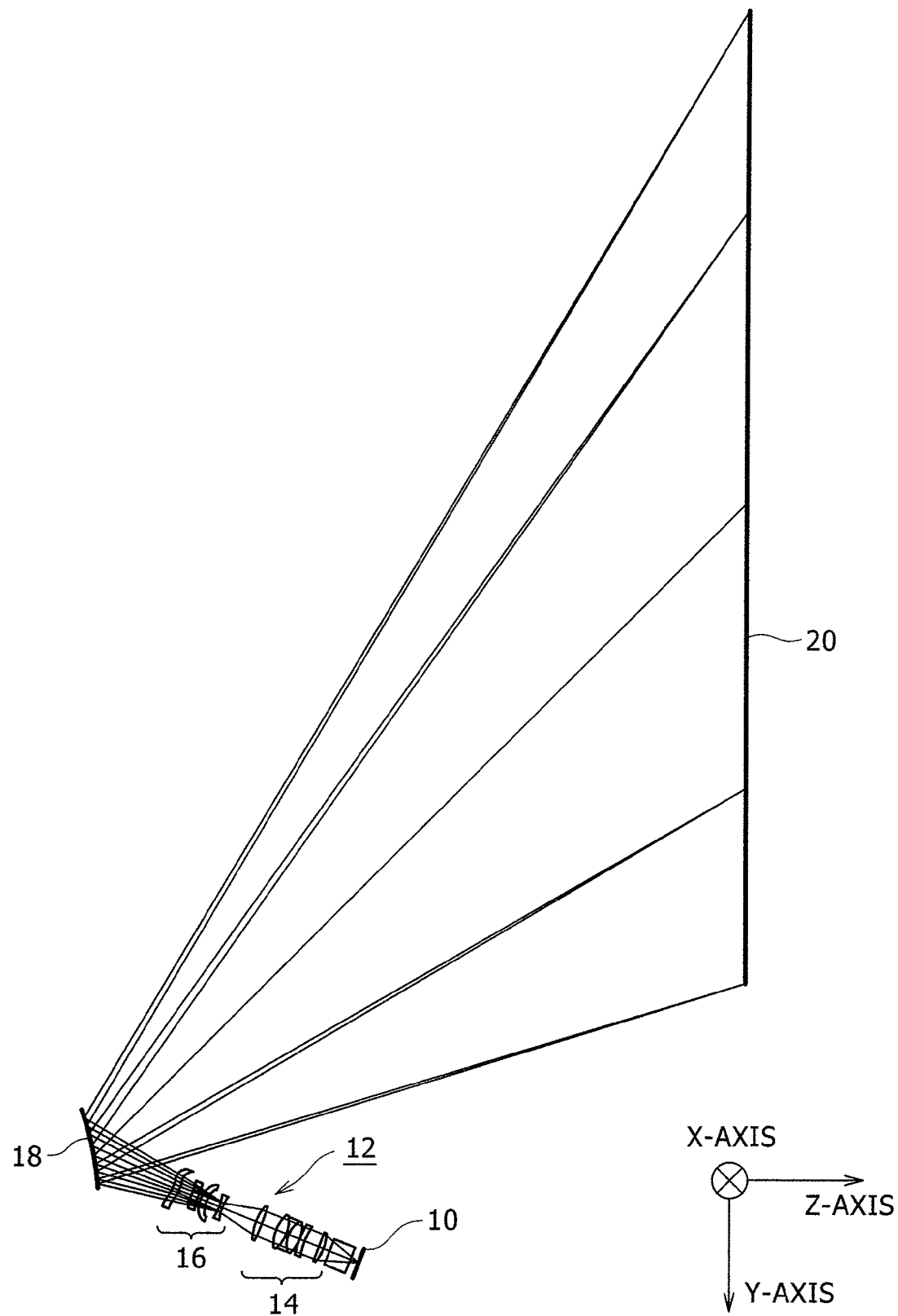
FIG. 4 is a cross-sectional view showing the optical system and the optical path in the projection type image display device taken along a line Y-Z according to the embodiment.

FIGS. 3 and 4 show light beam diagrams of the optical system according to the present invention on the basis of the numerical value example. In the above-mentioned X, Y, and Z orthogonal coordinate system, FIG. 3 shows an X-Z cross-sectional view, and FIG. 4 shows the structure of a Y-Z cross section. FIG. 3 shows an example in which a bending mirror 15 is disposed at the middle of the front group 14 of the projection lens 12 to bend an optical path in the X axial direction once. In FIG. 4, the bending mirror 15 is omitted, and the optical system is developed in the Z axial direction. The bending mirror is slightly arbitrary in the located position and the angle, and does not affect the functions of the respective optical elements. Accordingly, the bending mirror 15 will be omitted from the following description.

In this example, a light that is output from the image display element 10 that is display on the lower side of FIG. 4 first passes through the front group 14 which is made up of only lenses having only surfaces of a rotationally symmetrical configuration among the project lenses including plural lenses. Then, after the light passes through the rear group 16 including a free-shaped surface lens that is rotationally asymmetrical, and is reflected by the reflective surface of the free-shaped surface mirror 18 that is the second optical system, the light is input to the screen 20.

In this situation, the front group 14 of the projection lens 12 is made up of plural lenses each having a refractive surface of the rotationally symmetrical configuration, and two of those refractive surfaces are aspherical surfaces that are rotationally symmetrical, and other refractive surfaces are spherical surfaces.

The rotationally symmetrical aspherical surface used in this example is represented by the following expression using a local cylindrical coordinate system in each of the surfaces.

$$Z = \frac{cr^2}{1+\sqrt{1-(1+k)c^2r^2}} + A \cdot r^4 + B \cdot r^6 + C \cdot r^8 + \quad [\text{EX. 1}]$$

-continued
$$D \cdot r^{10} + E \cdot r^{12} + F \cdot r^{14} + G \cdot r^{16} + H \cdot r^{18} + J \cdot r^{20}$$

In this expression, r is a distance from the optical axis, and z represents the quantity of sag. Also, c is the curvature at a vertex, k is a conical constant, and A to J are the coefficients of the term of the power of r.

The free-shaped surface lenses in the rear group 16 of the projection lens 12 are represented by the following expression including the polynomial in X and Y, using the local orthogonal coordinate system (x, y, z) with the surface vertexes of the respective surfaces as origins.

$$Z = \frac{cr^2}{1+\sqrt{1-(1+k)c^2r^2}} + \sum_m \cdot \sum_n (C(m,n) \cdot x^m \cdot y^n) \quad [\text{EX. 2}]$$

In the expression, Z is the amount of sag in the configuration of the free-shaped surface mirror 18 in a direction perpendicular to the X and Y axes, c is the curvature at the vertex, r is a distance from the origin on the plane of X and Y axes, k is a conical constant, and C(m, n) is the coefficient of a polynomial.

In Table 1, Rd is the radius of curvature of the respective surfaces, and is a positive value in the case where the center of the curvature exists at the left side of the surface in the figure, and a negative value in the reverse case. Also, in Table 1, TH is a distance between both of the surfaces, and represents a distance between the vertex of one lens surface and the vertex of another lens surface. When the next lens surface is positioned at the left side of a certain lens surface, a distance between the surfaces is a positive value, but when the next lens surface is positioned at the right side thereof, the distance is a negative value. In Table 1, S5, S6, S16, and S17 are rotationally asymmetrical aspherical surfaces, and * is placed beside the surface Nos. in Table 1. The coefficients of the aspherical surfaces of those four surfaces are shown in Table 2. In Table 1, M is a position of the bending mirror that is disposed within the front group 14 of the projection lens. In fact, the optical axis is bent at the position of the mirror, but for simplification, in FIG. 6, only the position of the mirror is shown, and the optical axis is not bent. Also, S23 is a screen 20 but is not shown in FIG. 6 because the screen 20 is large and apart in the position from the mirror.

In Table 1, S18 to S21 are the respective refractive surfaces of the free-shaped surface mirrors, and S22 is a reflective surface of the free-shaped surface mirror 18, and # is placed beside the surface Nos. Table 3 shows the values of the coefficients representative of the configurations of those five free-shaped surfaces.

In Table 3, the names and values of the coefficients are laterally placed and indicated by frame sets. Each of the right sides is a value of the coefficient, each of the left sides is a name, and two numeric values separated by a comma in parentheses are values of m and n represented by Expression 2.

Table 4 shows the appearance of the inclinations and eccentricities of the local coordinate systems of the respective surfaces. In FIG. 4, the values of inclination angles and eccentricities are indicated at the right side of the surface Nos., and ADE is the magnitude of inclinations within a plane that is in parallel to the cross section of the figure. In the direction of inclination, a direction of rotating counterclockwise within the cross section of the figure is positive. Also, YDE is the magnitude of eccentricity, and the eccentricity is set in a direction perpendicular to the optical axis within the cross section of the figure, and the downward eccentricity is positive in the cross section of the figure.

TABLE 1

| Surface | Rd | TH | nd | vd |
|---|---|---|---|---|
| S0 | Infinity | 7.600 | | |
| S1 | Infinity | 22.200 | 1.51827 | 48.0 |
| S2 | Infinity | 5.940 | | |
| S3 | 49.502 | 4.500 | 1.85306 | 17.2 |
| S4 | 331.628 | 19.810 | | |
| S5* | −48.378 | 5.000 | 1.49245 | 42.9 |
| S6* | −44.556 | 0.100 | | |
| S7 | 36.813 | 11.700 | 1.49811 | 60.9 |
| S8 | −26.002 | 2.000 | 1.76014 | 20.0 |

TABLE 1-continued

| Surface | Rd | TH | nd | vd |
|---|---|---|---|---|
| S9 | 34.101 | 10.500 | 1.49811 | 60.9 |
| S10 | −41.686 | 16.700 | | |
| S11 | Infinity | 6.916 | | |
| S12 | 390.615 | 5.500 | 1.85306 | 17.2 |
| S13 | −55.474 | 41.490 | | |
| S14 | −32.974 | 3.200 | 1.74702 | 33.2 |
| S15 | 41.027 | 13.410 | | |
| S16* | −34.400 | 6.000 | 1.49245 | 42.9 |
| S17* | −34.372 | 4.354 | | |
| S18# | Infinity | 6.000 | 1.49245 | 42.9 |
| S19# | Infinity | 13.631 | | |
| S20# | Infinity | 6.000 | 1.49245 | 42.9 |
| S21# | Infinity | 91.615 | | |
| S22# | Infinity | 994.000 | REFL | |
| 23 | Infinity | — | | |

TABLE 2

| Surface | | | ASPHERICAL COEFFICIENT | | | | | |
|---|---|---|---|---|---|---|---|---|
| 5 | K | −16.8253667 | C | 1.411E−10 | F | 1.32578E−17 | J | 1.32493E−24 |
| | A | −7.3904E−06 | D& | −9.5853E−13 | G | 1.62824E−19 | | |
| | B | 7.8086E−08 | E | −3.6619E−15 | H& | −9.1486E−22 | | |
| 6 | K | −16.27613 | C | 1.56857E−10 | F | 2.6617E−17 | J | 3.61004E−25 |
| | A | −6.1863E−06 | D& | −1.3047E−12 | G | −3.4557E−20 | | |
| | B | 8.27674E−08 | E | −1.3982E−15 | H& | −1.6431E−22 | | |
| 16 | K | 1.40990458 | C | −4.9117E−10 | F | −7.7579E−17 | J | −1.171E−23 |
| | A | −8.1201E−06 | D& | 1.46681E−12 | G | −4.3529E−19 | | |
| | B | −1.1978E−07 | E | 1.64182E−14 | H& | 3.70855E−21 | | |
| 17 | K | 0.110993465 | C | 6.42048E−11 | F | −3.164E−19 | J | 9.52829E−26 |
| | A | −9.7761E−07 | D& | 4.40172E−13 | G | −7.357E−21 | | |
| | B | −9.8611E−08 | E | −1.6089E−16 | H& | −5.8716E−23 | | |

TABLE 3

| Surface | | | | SCULPTURED SURFACE COEFFICIENT | | | | |
|---|---|---|---|---|---|---|---|---|
| 18 | | | C(4, 1) | 1.72432E−06 | C(2, 5) | −5.1579E−09 | C(4, 5) | 1.08606E−11 |
| | K | 0 | C(2, 3) | 4.28069E−06 | C(0, 7) | −4.457E−09 | C(2, 7) | 3.30779E−11 |
| | C(2, 0) | −0.01191024 | C(0, 5) | 1.04149E−06 | C(8, 0) | 1.08279E−10 | C(0, 9) | 2.00303E−11 |
| | C(0, 2) | −0.00881379 | C(6, 0) | −4.6058E−09 | C(6, 2) | −4.3691E−10 | C(10, 0) | −2.4258E−13 |
| | C(2, 1) | −0.00084149 | C(4, 2) | 3.41321E−08 | C(4, 4) | −2.1017E−10 | C(8, 2) | 1.45607E−13 |
| | C(0, 3) | −0.00061966 | C(2, 4) | 5.55178E−08 | C(2, 6) | −1.4468E−10 | C(6, 4) | −9.7709E−15 |
| | C(4, 0) | −7.3166E−06 | C(0, 6) | −1.5257E07 | C(0, 8) | 7.48702E−11 | C(4, 6) | −3.7319E−13 |
| | C(2, 2) | 3.65472E−05 | C(6, 1) | −5.3929E−09 | C(8, 1) | −5.3571E−13 | C(2, 8) | 1.13123E−12 |
| | C(0, 4) | 4.11704E−05 | C(4, 3) | −1.3272E−08 | C(6, 3) | 2.57304E−11 | C(0, 10) | 6.35671E−13 |
| 19 | | | C(4, 1) | 7.57977E−07 | C(2, 5) | 1.02569E−09 | C(4, 5) | 2.50998E−12 |
| | K | 0 | C(2, 3) | 2.10513E−06 | C(0, 7) | 1.20068E−10 | C(2, 7) | 1.56078E−11 |
| | C(2, 0) | −0.01337536 | C(0, 5) | −2.9041E−07 | C(8, 0) | 1.16327E−11 | C(0, 9) | 8.9938E−12 |
| | C(0, 2) | −0.00699524 | C(6, 0) | 3.87971E−09 | C(6, 2) | −2.4594E−10 | C(10, 0) | −6.1875E−14 |
| | C(2, 1) | −0.00080155 | C(4, 2) | −3.51E−08 | C(4, 4) | −2.2753E−10 | C(8, 2) | 3.36824E−14 |
| | C(0, 3) | −0.00060182 | C(2, 4) | 7.02359E−09 | C(2, 6) | −4.2073E−10 | C(6, 4) | 3.15296E−13 |
| | C(4, 0) | −7.9939E−06 | C(0, 6) | −1.2885E−07 | C(0, 8) | −1.3623E−10 | C(4, 6) | 5.96813E−13 |
| | C(2, 2) | 4.52159E−05 | C(6, 1) | −2.149E−09 | C(8, 1) | −2.5306E−12 | C(2, 8) | 1.46997E−12 |
| | C(0, 4) | 4.49594E−05 | C(4, 3) | −5.1594E−09 | C(6, 3) | 1.07836E−11 | C(0, 10) | 7.70703E−13 |
| 20 | | | C(4, 1) | −9.8596E−07 | C(2, 5) | 1.421E−09 | C(4, 5) | −7.1946E−13 |
| | K | 0 | C(2, 3) | −9.4998E−07 | C(0, 7) | −1.0054E−09 | C(2, 7) | 9.36359E−14 |
| | C(2, 0) | 0.023821599 | C(0, 5) | −6.4906E−07 | C(8, 0) | 2.48962E−12 | C(0, 9) | 2.11887E−12 |
| | C(0, 2) | 0.013474681 | C(6, 0) | 4.97068E−10 | C(6, 2) | 1.90612E−11 | C(10, 0) | −2.2733E−15 |
| | C(2, 1) | 0.0008431 | C(4, 2) | −3.6308E−08 | C(4, 4) | 3.55632E−11 | C(8, 2) | −1.5104E−15 |
| | C(0, 3) | 0.000608183 | C(2, 4) | 2.24362E−09 | C(2, 6) | 7.74389E−11 | C(6, 4) | −2.265E−14 |
| | C(4, 0) | −7.6968E−06 | C(0, 6) | −1.3958E−08 | C(0, 8) | −8.3236E−11 | C(4, 6) | −5.8291E−14 |
| | C(2, 2) | 1.22122E−05 | C(6, 1) | 2.64099E−10 | C(8, 1) | 1.4488E−13 | C(2, 8) | −1.0792E−14 |
| | C(0, 4) | −1.4748E−05 | C(4, 3) | 1.00607E−09 | C(6, 3) | −2.8264E−13 | C(0, 10) | 4.42667E−14 |
| 21 | | | C(4, 1) | −1.4404E−06 | C(2, 5) | 1.74696E−09 | C(4, 5) | −74988E−13 |
| | K | 0 | C(2, 3) | −1.1592E−06 | C(0, 7) | −1.4026E−09 | C(2, 7) | −9.6808E−13 |
| | C(2, 0) | 0.0279350762 | C(0, 5) | −6.2826E−07 | C(8, 0) | 1.66819E−12 | C(0, 9) | 2.94369E−12 |
| | C(0, 2) | 0.01167011 | C(6, 0) | 2.35765E−09 | C(6, 2) | 1.41457E−11 | C(10, 0) | −2.1343E−15 |
| | C(2, 1) | 0.001050121 | C(4, 2) | −2.8413E−08 | C(4, 4) | 3.9983E−11 | C(8, 2) | 9.26704E−16 |
| | C(0, 3) | 0.000623744 | C(2, 4) | 1.48864E−08 | C(2, 6) | 3.94335E−11 | C(6, 4) | −3.0762E−14 |
| | C(4, 0) | −1.0591E−05 | C(0, 6) | 4.17266E−09 | C(0, 8) | −1.1069E−10 | C(4, 6) | −3.511E−14 |

TABLE 3-continued

| Surface | | | | SCULPTURED SURFACE COEFFICIENT | | | | |
|---|---|---|---|---|---|---|---|---|
| | C(2, 2) | 5.88467E−06 | C(6, 1) | 7.33762E−10 | C(8, 1) | −2.5174E−14 | C(2, 8) | −1.6265E−14 |
| | C(0, 4) | −2.3382E−05 | C(4, 3) | 1.40931E−09 | C(6, 3) | −5.7732E−13 | C(0, 10) | 1.38018E−13 |
| 22 | | | C(4, 1) | −1.45E−08 | C(2, 5) | −2.08E−12 | C(4, 5) | −1.52E−16 |
| | K | 0 | C(2, 3) | 4.98E−09 | C(0, 7) | 5.07E−13 | C(2, 7) | −4.99E−16 |
| | C(2, 0) | 0.003865204 | C(0, 5) | 6.80E−09 | C(8, 0) | −5.29E−15 | C(0, 9) | 9.43E−17 |
| | C(0, 2) | 0.00154589 | C(6, 0) | 4.52E−11 | C(6, 2) | 5.55E−14 | C(10, 0) | 3.15E−19 |
| | C(2, 1) | 6.8398E−05 | C(4, 2) | −3.19E−10 | C(4, 4) | −2.44E−14 | C(8, 2) | −3.17E−18 |
| | C(0, 3) | 3.28452E−05 | C(2, 4) | −3.58E−11 | C(2, 6) | −5.34E−14 | C(6, 4) | 6.91E−18 |
| | C(4, 0) | −3.5186E−07 | C(0, 6) | 2.82E−11 | C(0, 8) | 2.49E−14 | C(4, 6) | −3.46E−18 |
| | C(2, 2) | 8.26544E−07 | C(6, 1) | 2.32E−12 | C(8, 1) | −2.00E−16 | C(2, 8) | 8.68E−19 |
| | C(0, 4) | 5.71083E−07 | C(4, 3) | −4.02E−12 | C(6, 3) | 7.78E−16 | C(0, 10) | −3.22E−18 |

TABLE 4

| Surface | ADE(°) | YDE(mm) |
|---|---|---|
| S3 | 2.980 | 1.430 |
| S22 | 33.000 | 0.0 |
| S23 | −45.100 | 0.0 |

Figure 5:
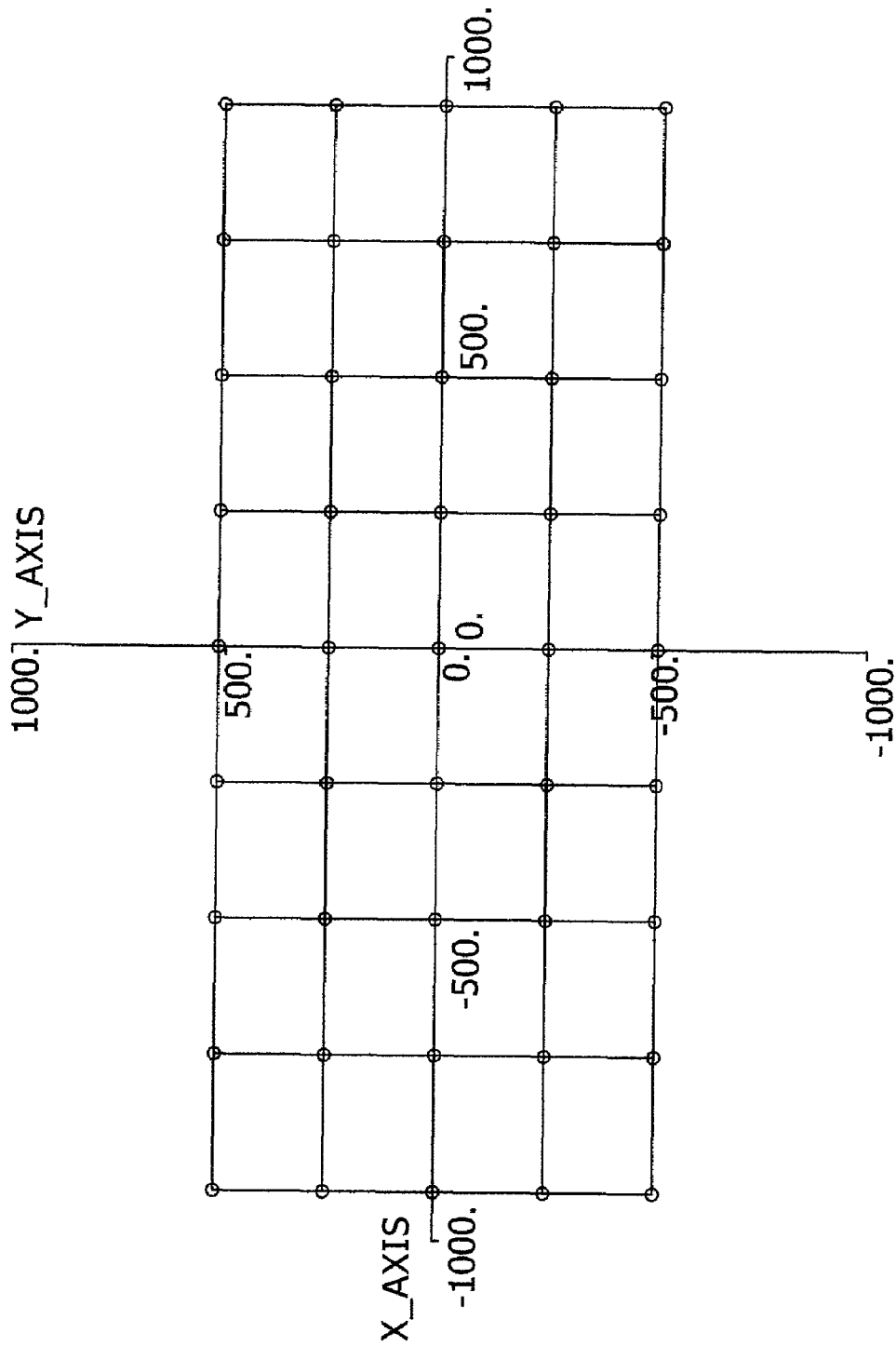
FIG. 5 is a diagram showing a distortion performance of the projection type image display device according to the embodiment.

The numeric values in the above Tables 1 to 4 are an example in which an image in a range of 12.16×6.84 on the object surface is projected to the sizes of 1841.9×1036.1 on the image surface. The figure distortion in this case is shown in FIG. 5. The longitudinal direction of FIG. 5 is a vertical direction of FIG. 4, which is a direction of Y-axis. The lateral direction of FIG. 5 is a direction orthogonal to Y axis on the screen 20, and the center of a rectangle in the figure is the center of the screen. The figure shows the appearance of the figure distortion which indicates a bending state of straight lines which are divided into four sections in the longitudinal direction of the screen and divided into eight sections in the lateral direction.

Figure 7:
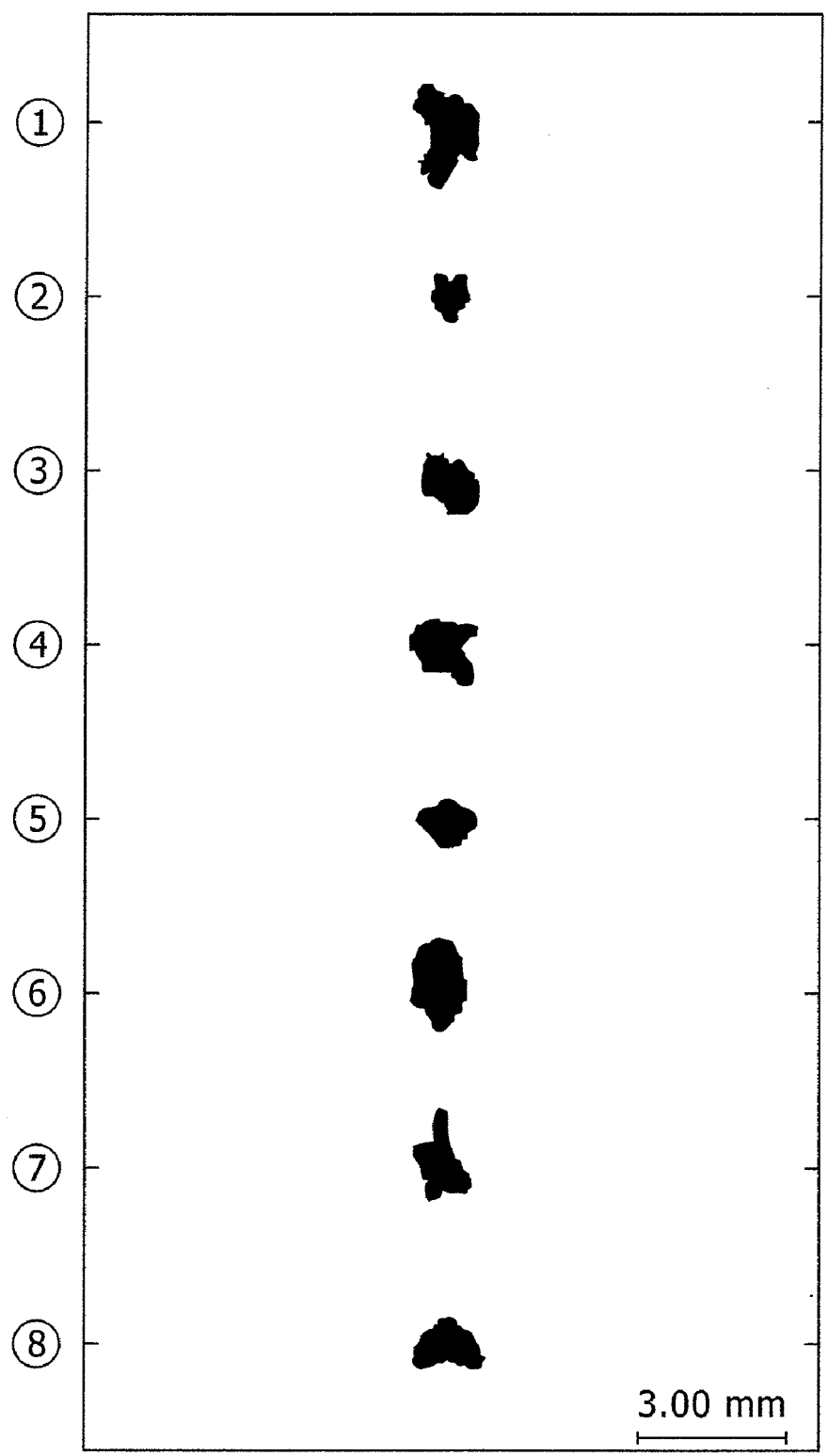
FIG. 7 is a diagram showing a spot performance of the projection type image display device according to the embodiment.
Figure 8:
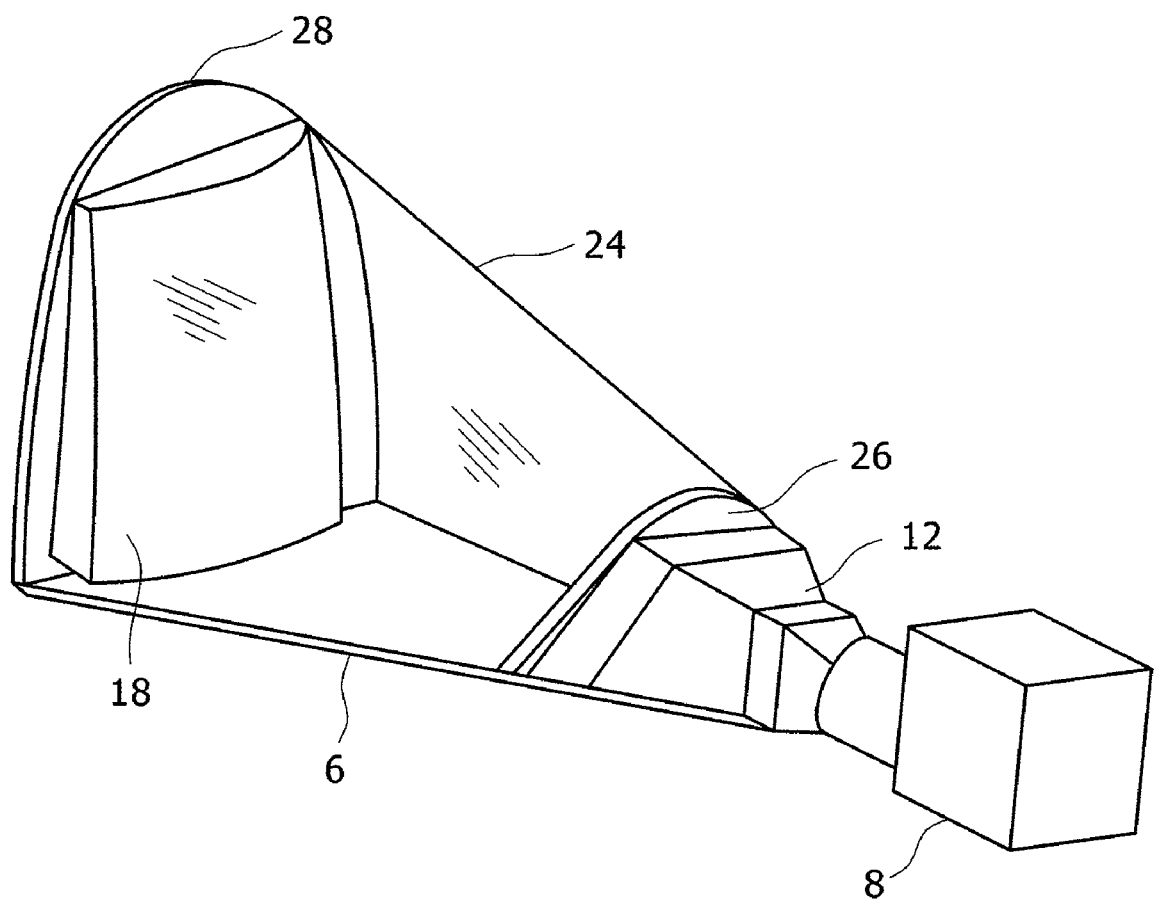
FIG. 8 is a perspective view showing the main portion of the projection type image display device according to the embodiment.

FIG. 7 shows a spot diagram in this numeral embodiment. In FIG. 7, the spot diagrams of light beams that have been output from eight points consisting of (6.08, 3.42), (0, 3.42), (3.65, 2.05), (6.08, 0), (0, 0), (3.65, −2.05), (6.08, −3.42), and (0, −3.42) which are the values of X and Y coordinates on the display screen of an image display element 11 are indicated with beginning at the top. The unit is mm. The lateral direction of the respective spot diagrams are the X direction on the screen, and the longitudinal direction is the Y direction on the screen. As described above, both of those directions maintain the excellent performances.

Figure 6:
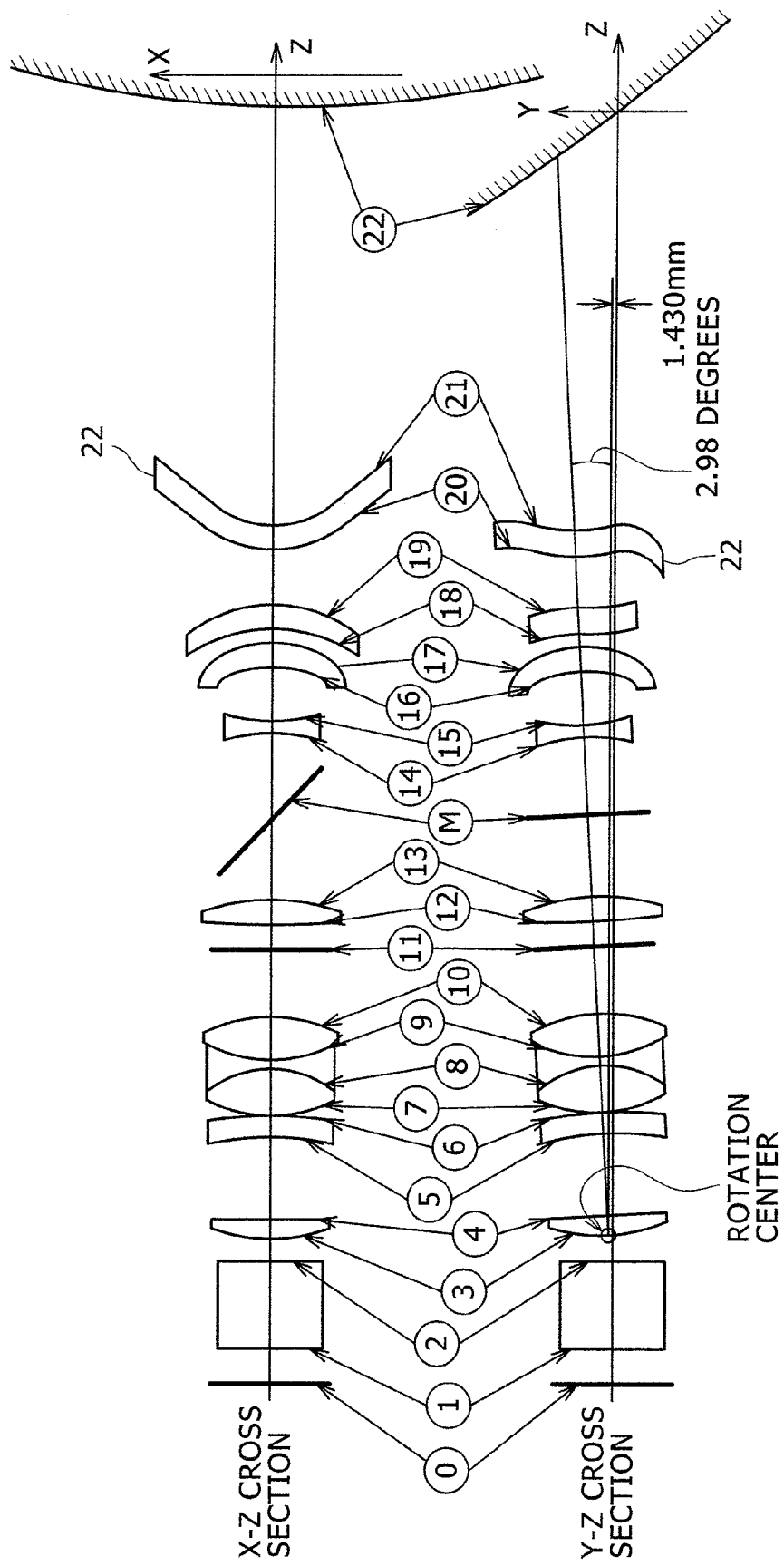
FIG. 6 is a diagram for explaining plane Nos. of the optical parts in the projection type image display device according to the embodiment.

Since the surfaces S0 to S20 shown in FIG. 6 are housed in a vessel such as a chassis or a lens barrel, it is possible to sufficiently cope with the dirt and dust.

On the contrary, the free-shaped surface lens 22 that is disposed closest to the free-shaped surface mirror 18 side, and the free-shaped surface mirror 18 among the lenses that form the projection lens 12 are covered with a transparent cover 24 having an optical transparency. The transparent cover 24 is formed of a curved member and is so formed as to provide an arc which is substantially centered on points at which the lens surface S21 of the free-shaped surface lens 22 at the free-shaped surface mirror 18 side and the reflective surface S22 of the free-shaped surface mirror 18 intersect the Z axis.

One of both curved ends of the transparent cover 24 is fitted to a lens guard 26 of the free-shaped surface lens 22. Also, the other end of both the curved ends is fitted to a mirror guard 28 of the free-shaped surface mirror 18. Further, an end of the transparent cover 24 which is not curved is fitted in close contact with the bottom plate 6. Hence, the lens surface S21 of the free-shaped surface lens 22 which faces the free-shaped surface mirror 18 and the reflective surface S22 of the free-shaped surface mirror 18 are housed in a closed space which is defined within the projection type image display device 1 so as to be shielded from the ambient air.

Because the transparent cover 24 is curved, the light beam that is output from the free-shaped surface mirror 18 does not form a large incident angle with respect to the transparent cover. For that reason, there does not arise such a problem that the image light is reflected by the transparent cover 24 to darken the image peripheral portion. In this embodiment, the incident angle of the light beam which is input to the transparent cover 24 is about 20° at the image peripheral portion, and the incident angle is 33° at maximum at the image center lowest portion. The transmittance of the image light in this case is 89% which is sufficient in the practical use, and a transmission increasing process can be further conducted to improve the transmittance.

Also, The material of the transparent cover 24 is not particularly limited, but it is preferable to use, for example, plastic that is excellent in flexibility. The transparent cover is made of plastic having the above feature, thereby making it possible to easily fix the lens guard 26, the mirror guard 28, and the bottom plate 6. Also, the transparent cover is made of plastic having the above feature, thereby making it to easy to exchange the transparent cover 24 when the transparent cover 24 has been damaged or contaminated.

FIG. 9 is a perspective view showing the transparent cover 24 according to another embodiment. In FIG. 9, the light beam L2 and the light beam L3 shown in FIG. 2 are added. Because the respective right and left light beams are laterally superimposed on each other in FIG. 2, only one of the respective light beams is shown in FIG. 2. However, since FIG. 9 is a perspective view, two right and left light beams are shown. Those four light beams represent the light beams of four corners of the image.

The transparent cover 24 needs to be transparent only in a range of the image light which is projected to the screen 20. A portion other than the range where the light beam L2 and the light beam L3 are transmitted can be shielded from the light. The light shielding of the transparent cover is conducted by, for example, painting or printing the surface of the transparent cover 24.

The light shielded portion is better as the brightness thereof is lower. In particular, it is preferable to use black paint. Also, for example, it is possible that the inside of the light shielding region of the transparent cover 24 is painted with a black paint while the outside thereof is painted with a color that takes the design of the overall projection type image display device into consideration. In this way, the outside light is prevented from entering the projection type image display device 1 as much as possible, thereby enabling the contrast of the image to be improved.

Subsequently, a description will be given of the action of the projection type image display device 1 according to this embodiment.

When the projection type image display device 1 according to this embodiment is powered, an image light is output from the image generation source 8, and then projected onto the projection lens 12. The image light that has been projected onto the projection lens 12 penetrates through the lenses that form the projection lens 12, and is output from the free-shaped surface lens 22. Thereafter, the image light is projected onto the free-shaped surface mirror 18, and reflected by the free-shaped surface mirror 18.

The image light that has been reflected by the free-shaped surface mirror 18 is irradiated onto the transparent cover 24. In this situation, since the image light is irradiated onto the transparent portion of the transparent cover 24, the image light that has penetrated through the transparent portion is irradiated onto the screen 20 to display the image. Since the transparent cover 24 is curved, there is substantially no loss of the image light that has been projected from the free-shaped surface mirror 18, and the image light penetrates through the transparent cover 24, and is then irradiated onto the screen 20. Also, since the light outside of the projection type image display device 1 is shielded by the light shielded portion of the transparent cover 24, the ambient light is prevented from entering the projection type image display device 1.

Also, the light reflective surface of the free-shaped surface mirror 18 and the light output surface of the free-shaped surface lens 22 are housed in a closed space which is isolated from the external of the projection type image display device 1 by the aid of the transparent cover 24. As s result, even if the free-shaped surface mirror 18 and the free-shaped surface lens 22 are charged at the time of driving the projection type image display device 1, there is no case in which the dirt or dust is attached onto the dirt or dust in the air is attached onto the mirror or lens surface.

As described above, according to this embodiment, since the free-shaped surface mirror 18 and the free-shaped surface lens 22 are covered with the transparent cover 24, those members are not contaminated with the dirt or dust in the air. Also, since the transparent cover 24 is curved, because the largest incident angle of the light beam that is input to the transparent cover 24 is not increased, there is no disadvantage that both ends of the screen are darkened due to the reflection loss of the transparent cover.

According to the present invention, it is possible to protect the optical parts from the dirt or dust in the air while suppressing the deterioration of the image quality.

What is claimed is:

1. A projection type image display device, comprising:
an image generation source that generates an image;
a first optical system having a plurality of lenses which expansion-projects the image from the image generation source;
a second optical system that reflects the image from the first optical system; and
a curved transparent member that is disposed between the first optical system and the second optical system, and covers a space between a surface of a lens positioned closest to the second optical system among the plurality of lenses, which outputs the image, and the surface of the second optical system which reflects the image;
wherein the first optical system is housed in a vessel;
a first guard is formed at an end of the vessel at the second optical system side;
a second guard is formed on a side edge of the second optical system; and
both ends of the transparent member are fitted to the first guard and the second guard.

2. The projection type image display device according to claim 1,
wherein an area other than the area through which the image that has been reflected by the second optical system of the transparent member passes is subjected to light shielding processing.

3. The projection type image display device according to claim 2,
wherein the light shielding processing is conducted by painting or printing.

4. The projection type image display device according to claim 1,
wherein the lens positioned closest to the second optical system among the plurality of lenses of the first optical system comprises a free-shaped surface lens; and
the second optical system includes one of a free-shaped surface mirror and an aspherical mirror.

5. The projection type image display device according to claim 4,
wherein one of the free-shaped surface lens and the aspherical mirror are convex in a direction of reflecting the image.

6. The projection type image display device according to claim 1,
wherein the transparent member is made of a flexible material.

7. A projection type image display device, comprising:
an image generation source that generates an image;
a first optical system having at least a free-shaped surface lens that enlarges the image which is output from the image generation source and is positioned farthest from the image generation source;
a free-shaped surface mirror that reflects the image from the first optical system; and
a curved transparent member that covers a space between a surface of the first optical system which outputs the image and a surface of the free-shaped surface mirror which reflects the image;
wherein the first optical system is housed in a vessel;
a first guard is formed at an end of the vessel at the free-shaped surface mirror side;
a second guard is formed on a side edge of the free-shaped surface mirror; and
both ends of the transparent member are fitted to the first guard and the second guard.

8. The projection type image display device according to claim 7,
wherein an area other than the area through which the image that has been reflected by the free-shaped surface mirror of the transparent member passes is subjected to light shielding processing.

9. The projection type image display device according to claim 8,
wherein the light shielding processing is conducted by painting or printing.

10. The projection type image display device according to claim 7,
wherein the transparent member is made of a flexible material.

11. A projection type image display device, comprising:
an image generation source that generates an image;

a first optical system having a plurality of lenses which expansion-projects the image from the image generation source;

a convex mirror that reflects the image from the first optical system, and has a convex surface which is convex in a direction of reflecting the image; and a transparent member that is disposed between the first optical system and the convex mirror, covers a space between a surface of a lens positioned closest to the convex mirror among the plurality of lenses, which outputs the image, and the surface of the convex mirror which reflects the image, and has a curved portion through which the image reflected by the convex mirror passes;

wherein the first optical system is housed in a vessel;

a first guard is formed at an end of the vessel at the convex mirror side;

a second guard is formed on a side edge of the convex mirror; and both ends of the transparent member are fitted to the first guard and the second guard.

12. The projection type image display device according to claim 11, wherein an area other than the area through which the image that has been reflected by the convex mirror of the transparent member passes is subjected to light shielding processing.

13. The projection type image display device according to claim 12, wherein the light shielding processing is conducted by painting or printing.

14. The projection type image display device according to claim 11, wherein the lens positioned closest to the convex mirror among the plurality of lenses of the first optical system comprises a free-shaped surface lens.

15. The projection type image display device according to claim 11, wherein the transparent member is made of a flexible material.

* * * * *